United States Patent
Kong et al.

(10) Patent No.: US 7,548,270 B2
(45) Date of Patent: Jun. 16, 2009

(54) METHOD OF EXPOSURE CONTROL FOR AN IMAGING SYSTEM

(75) Inventors: Hongzhi Kong, Shanghai (CN); Qin Sun, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 666 days.

(21) Appl. No.: 11/222,285

(22) Filed: Sep. 8, 2005

(65) Prior Publication Data

US 2007/0052839 A1    Mar. 8, 2007

(51) Int. Cl.
*H04N 5/238* (2006.01)
(52) U.S. Cl. ...................... 348/366; 348/364
(58) Field of Classification Search .......... 348/216.1, 348/217.1, 229.1, 234, 297, 362, 364, 366
See application file for complete search history.

(56) References Cited

U.S. PATENT DOCUMENTS

| | | | |
|---|---|---|---|
| 5,420,635 A | 5/1995 | Konishi et al. | |
| 6,167,200 A * | 12/2000 | Yamaguchi et al. | 396/65 |
| 6,728,401 B1 * | 4/2004 | Hardeberg | 382/167 |
| 2003/0081133 A1 * | 5/2003 | Lee et al. | 348/229.1 |
| 2004/0066458 A1 * | 4/2004 | Kawamura et al. | 348/216.1 |
| 2005/0206750 A1 * | 9/2005 | Aoyagi et al. | 348/238 |
| 2006/0001748 A1 * | 1/2006 | Kamon et al. | 348/234 |
| 2006/0125952 A1 * | 6/2006 | Kubota | 348/362 |
| 2007/0052821 A1 * | 3/2007 | Fukui | 348/234 |

FOREIGN PATENT DOCUMENTS

WO    03/083773    10/2003

OTHER PUBLICATIONS

Communication from European Patent Office for European Application No. 06076650.8-2209, Oct. 19, 2007 (7 pages).

* cited by examiner

*Primary Examiner*—Sinh N Tran
*Assistant Examiner*—Albert H Cutler
(74) *Attorney, Agent, or Firm*—Jimmy L. Funke

(57) ABSTRACT

A method of exposure control for an imaging system. A predetermined number of images are captured by one or more imagers, wherein the images are defined by an image resolution matrix. The images are masked to establish a region of interest within the image resolution matrix and brightness of the images is analyzed within the region of interest. An exposure time is calculated for a subsequent image capturing step based on the brightness analysis, and an exposure time setting of the imager(s) is adjusted during the subsequent image capturing step based on the calculated exposure time.

6 Claims, 5 Drawing Sheets

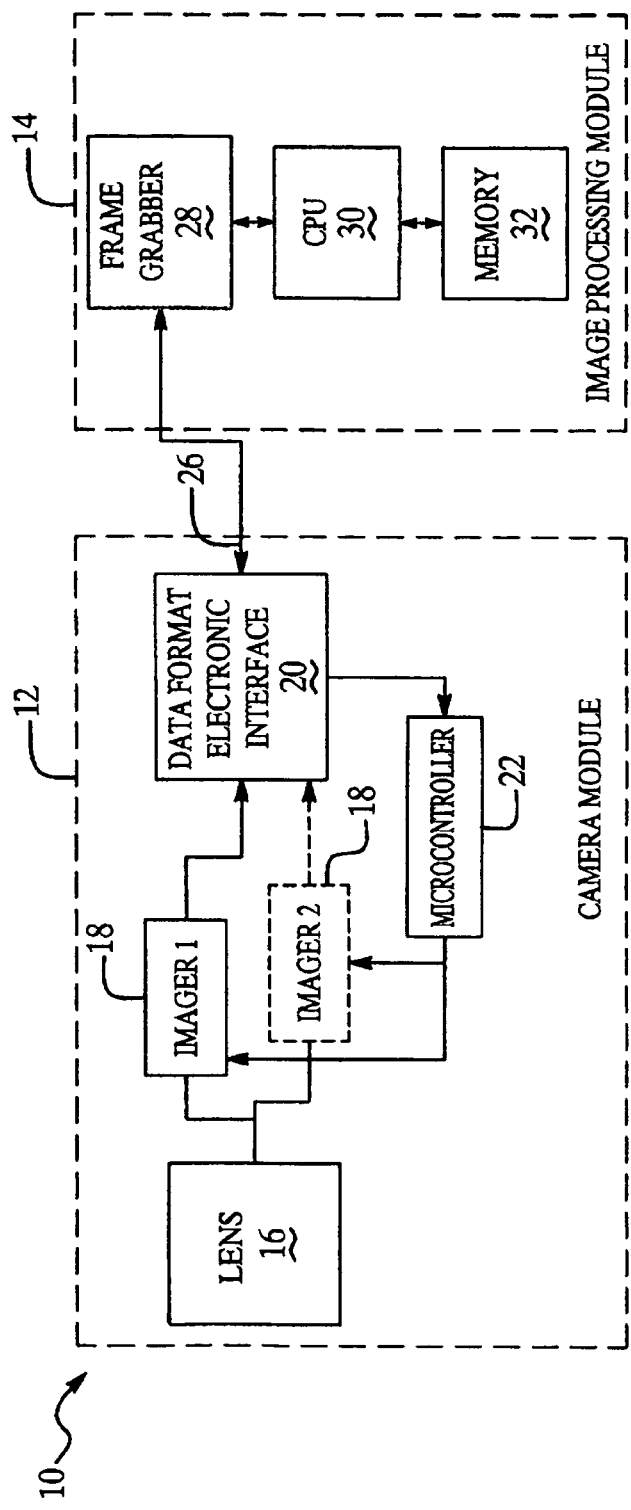
Figure 1
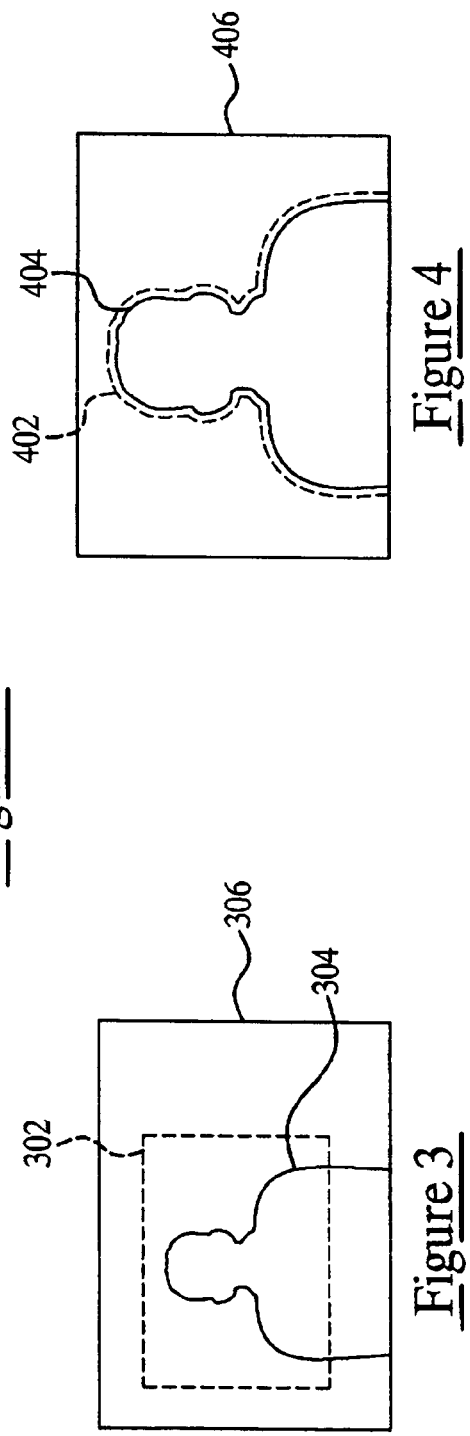
Figure 4
Figure 3

METHOD OF EXPOSURE CONTROL FOR AN IMAGING SYSTEM

FIELD OF THE INVENTION

This invention relates generally to electronic imaging and, more particularly, to adaptive exposure control for electronic imaging.

BACKGROUND OF THE INVENTION

Various methods and systems for controlling camera exposure settings are used in various vision-based applications, such as vehicle-occupant pattern-recognition applications. But vehicle lighting conditions are not always easily controllable in vehicle driving environments. For example, such environments include vastly differing and rapidly changing conditions, including total darkness, headlight flooding, sunny, cloudy, and shadowy lighting conditions.

The prior art includes several approaches for controlling exposure to account for such drastic changes in lighting. For example, many conventional exposure control methods involve image sophisticated histogram-based operations. But such operations require relatively high processing power and time to execute complex algorithms and, thus, may be too slow to carry out a dynamic occupant-sensing process. Other conventional exposure control methods involve special hardware designs to avert the need for complex algorithms, but at relatively high cost and complexity of camera components. Still other approaches use light-intensity detectors integrated with a camera system for better exposure control. Usually, however, such conventional methods provide only global exposure control, and extreme intensity variations in the background of an image tend to negatively affect the effectiveness of the exposure control system.

SUMMARY OF THE INVENTION

In accordance with the teachings of the present invention, a method and system for controlling image exposure are provided. In accordance with one aspect of the present invention, the method of exposure control for an imaging system includes the steps of capturing a predetermined number of images, wherein the images are defined by an image resolution matrix, masking the images to establish a region of interest within the image resolution matrix, and analyzing brightness of the images within the region of interest. The method also includes the steps of calculating an exposure time for a subsequent image capturing step based on the analyzing brightness step, and adjusting an exposure time setting during the subsequent image capturing step based on the calculated exposure time.

According to another aspect of the present invention, the system includes an imager having a plurality of elements that define an image resolution matrix, a lens to direct radiant energy on the imager, and a controller to control the imager. The system also includes an image capture device to capture a predetermined number of images defined by the image resolution matrix, an image processor in communication with the image capture device, and a memory in communication with the image processor. The memory stores a computer-readable medium carrying instructions executable by the image processor to control the system in carrying out the following functions: masking each image to establish a region of interest within the image resolution matrix; analyzing brightness of each image within its region of interest; calculating an exposure time for a subsequent image capture based on the analyzed brightness; and adjusting an exposure time setting of the imager during the subsequent image capture based on the calculated exposure time.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIG. 1 is a block diagram of an exemplary embodiment of an imaging system;

FIG. 3 is a diagram of an image field including a fixed Region Of Interest;

FIG. 4 is a diagram of an image field including an adaptive Region Of Interest;

DETAILED DESCRIPTION OF THE PREFERRED EMBODIMENTS

System

Figure 2:
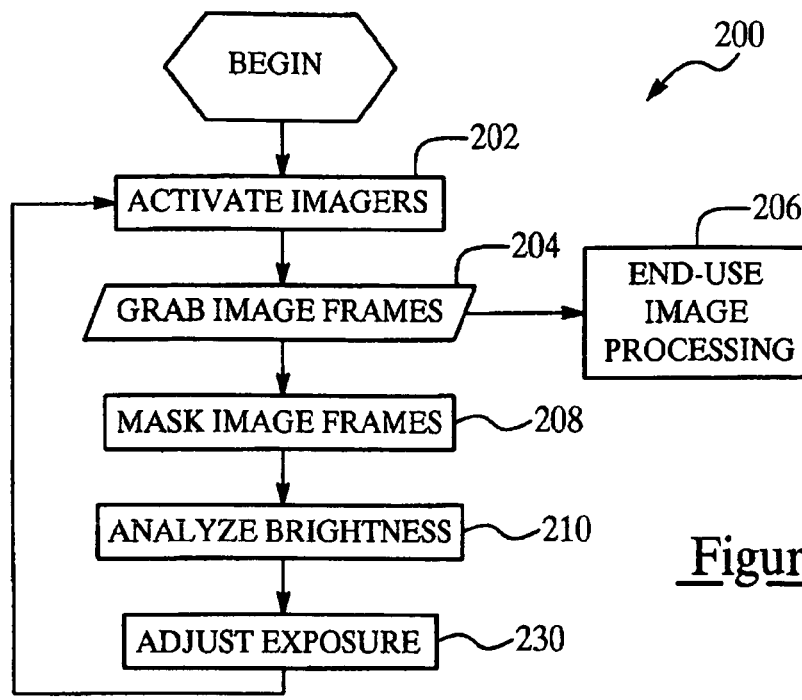
FIG. 2 is a flow chart of an exemplary embodiment of a method of controlling image exposure of the imaging system of FIG. 1.

Referring now in detail to the figures, there is shown in FIG. 1 a block diagram of an imaging apparatus or system 10 for capturing and processing video and/or still images. The imaging system 10 is preferably adapted for use within an automotive vehicle and generally includes a camera module 12 for capturing video images and an image processing module 14 in communication with the camera module 12 for capturing images or image frames from the video images and for processing the images, wherein power is provided by a power supply such as a battery (not shown).

In general, image capturing methods and systems are widely used in various applications including videography, photography, infrared photography, ultraviolet photography, stereoscopic photography, microphotography, and thermography. The process of capturing images may include forming an image of a subject or object on a photosensitive surface by introducing light or other forms of radiation thereto. As used herein, the term "image" includes either a visible or an electronic manifestation of a subject, scene, or view. Imaging systems may include various devices such as digital cameras and digital video cameras like the camera module 12. The camera module 12 captures a subject, scene, or view in elemental portions and generates an electronic signal that is representative of the subject, scene, or view. The camera module 12 is preferably at least partially integrated into a vehicle instrument panel, wherein the camera module 12 is preferably adapted to capture images of an occupant of a vehicle seat.

The camera module 12 is capable of operation with, and fast adaptation to, a variety of lighting conditions ranging from very bright sunlit environments to very dimly lit or dark environments. Such "no-light" to "bright-light" performance of the camera module 12 is implemented according to an exemplary method, as will be discussed in greater detail below, with particular reference to FIGS. 2 and 3. In any case, the camera module 12 includes a lens 16 for directing light into the camera module 12, and image capturing media or imagers 18 in optical communication with the lens 16 for capturing the light directed into the camera module 12. The camera module 12 also includes an electronic interface 20 in electrical communication with the imagers 18 for formatting data output by the imagers 18, and an exposure control microcontroller 22 in electrical communication between the interface 20 and the imagers 18 for controlling the exposure settings of the imagers 18.

Any suitable lens 16 or lenses may be used but the lens 16 preferably has fixed magnification and aperture settings. In any case, the lens 16 is used to direct radiant energy, such as light, into the camera module 12 by focusing, isolating, or framing a selected physical subject or object from which rays of energy emanate or reflect. In other words, the lens 16 provides a conduit into which rays of light are received and through which the rays of light travel to the inside of the camera module 12 and impinge on the imagers 18.

The imagers 18 may include one or more electronic devices to convert radiant energy or optical images impinged thereon into raw digital data, or converted images, that are representative of the optical image. As shown, two or more devices may be used, such as where stereo imaging is desired. The digital data may be stored and/or processed for display or for use as input in downstream operations like airbag deployment in a vehicle. Conventional film cameras use a photoresponsive film as the image capturing medium, whereas digital cameras, like the camera module 12, typically use electronic photosensors such as one or more charge coupled device (CCD) or complimentary metal oxide semiconductor (CMOS) chips. The term photosensor includes any device(s) or material(s) capable of performing the same or similar function as CCD or CMOS chips: receiving and capturing radiant energy, and being at least partially capable of converting the radiant energy into electronic signals that become a virtual representation of the optical image or radiant energy projected onto the imagers 18 through the lens 16.

For example, a CMOS chip includes an array of very fine electronic "picture elements" or "pixels" arranged in horizontal rows and vertical columns that define an image resolution matrix. Each pixel also has an image resolution "depth". The pixel depth of the camera module 12 is preferably 8 bits, wherein the minimum pixel brightness value is 0 and the maximum pixel brightness (saturation) value is 255. Upon exposure to imaging light from a subject, the imagers 18 collect an array of discrete light energies or photon charges that correspond to or map the photographic subject or object column-by-column, row-by-row, and pixel-by-pixel such that a photon charge representation of the subject is seized by the imagers 18. The imagers 18 may use on or off-chip electronic circuits to process the photon charges and convert them into useful digital signals that can be stored in electronic memory.

In response to extreme lighting conditions, the camera module's exposure must be adjusted. For example, a CMOS image sensor or imager may use an electronic "rolling shutter" to adjust exposure of the camera. Typically, the rows of pixels in the CMOS image sensor are reset in sequence, starting at the top of the image and proceeding row by row to the bottom. When this reset process has progressed a predetermined distance down the image, the readout process begins, wherein data from rows of pixels are read out in sequence, starting at the top and proceeding row by row to the bottom in the same manner and at the same speed as the reset process.

The time delay between a row being reset and a row being read out is referred to as the integration time, which is essentially the length of time that the image sensor is exposed to light while capturing an image. Exposure time of film in a photographic camera is basically the analog to integration time and, thus, the terms are used interchangeably herein. In any case, the longer the exposure or integration time, the more light will be acquired by the imagers 18, wherein lower light conditions require longer exposure times to collect a sufficient amount of light and vice-versa. By varying the amount of time between when the reset sweeps past a row and when the readout of the row takes place, the integration or exposure time can be controlled. In many applications, integration time can be varied from a single pixel row read out (i.e. reset followed by read out in the next line) up to a full frame read out (i.e. reset reaches the bottom of the image before reading starts at the top) or more.

The interface 20 formats output from the imagers 18 for use by the image processing module 14 and the imager microcontroller 22. In one exemplary implementation, the interface 20 may be a Camera Link transmitter and a differential pair transceiver to link the electronic communications between the imagers 18, microcontroller 22, and the image frame grabber 28. As used herein, the term interface broadly means any suitable form of electronic device or adapter, or even a software module or adapter, which enables one piece of equipment to communicate with or control another.

The microcontroller 22 may be used to control any suitable features of the imagers 18, and is preferably adapted to receive instructions from the image processing module 14 via the interface 20 for adjusting the exposure settings of the imagers 18. The microcontroller 22 operates under control programs or software that is preferably stored in internal or external memory (not shown) to which the microcontroller 22 may be connected.

A data bus 26 electrically communicates the camera module 12 to the image processing module 14. The data bus 26 may be a Camera Link™ bus, a multiplex cabling system, or the like, and is used to transfer control, timing, and data signals between the camera module 12 and image processing module 14.

The image processing module 14 receives image capture data from the camera module 12 and processes the data to control the camera module 12, and to relay the data to another system such as an occupant sensing system, such as for use of the data in deploying airbags. The image processing module 14 may include a frame grabber 28 for receiving captured video image data from the camera module 12, an image processor or central processing unit (CPU) 30 in communication with the frame grabber 28 for controlling the frame grabber 28, and a memory 32 in communication with the CPU 30 for storing data and computer readable instructions executable by the CPU 30.

Preferably, the frame grabber 28 captures frames or still images from the video image data streamed from the camera module 12. Frame grabbers are widely known to those of ordinary skill in the art and any suitable frame grabber may be used.

The memory 32 may include computer readable storage or media in the form of removable and/or non-removable, volatile memory and/or non-volatile memory and may be used to store any imaging system data such as operating systems, program code or operating software, device drivers, user instructions, digital images, or the like. Exemplary volatile memory may include random access memory (RAM), static RAM (SRAM), dynamic RAM (DRAM), and the like, for running software and data on the processor. RAM typically contains data and/or program modules that are immediately accessible to and/or presently being operated on by the processor. By way of example, and not limitation, the volatile memory may include an operating system, application programs, other memory modules, and data. Exemplary non-volatile memory may include read only memory (ROM), erasable programmable ROM (EPROM), electrically erasable programmable ROM (EEPROM), dynamic read/write memory like magnetic or optical disks or tapes, and static read/write memory like flash memory, for storing software and data.

The exemplary method described herein below may be deployed on the exemplary system 10 described herein that includes one or more processors configured to execute control logic or algorithms stored in memory that provide the method functionality of the system 10. In this respect, the processors are powered by a power supply (not shown) and may initially operate on instructions stored in internal memory. The processors may receive commands or data from a user or another processor through suitable input devices or interfaces, and may receive, process, and store data or instructions from various storage media including the memory described herein, and outputs data or instructions to one or more of the other system components described herein. The processors of the present system 10 may be programmed to carry out computer-executable instructions, such as those associated with or embedded in software or computer programs such as operating systems, application programs, and the like.

Accordingly, the processors may encompass one or more processing units, controllers, microprocessors, micro-controllers, discrete logic circuits having logic gates for implementing logic functions upon data signals, application specific integrated circuits (ASIC) with suitable logic gates, complex programmable logic devices (CPLD), programmable or field-programmable gate arrays (PGA/FPGA), any combinations of the aforementioned, and the like. As used herein, the processors are also considered to include any ancillary devices such as clocks, power supplies, and the like.

The memory media/modules discussed above enable storage and communication of data, data structures, and computer programs or software that may include executable instructions for implementing logical functions and can be embodied in any computer-readable medium for use by or in connection with the processor, which can retrieve and execute the instructions. The software may include, but is not limited to routines, modules, objects, components, data structures, and the like, for performing particular tasks and/or implementing particular abstract data types. Computer programs may exist in a variety of forms both active and inactive. General examples include software programs comprised of instructions in source code, object code, executable code or other formats; firmware programs; or hardware description language (HDL) files; and the like. Specific examples include assembler, C, C++ objects, Visual Basic, Visual C++, XML, Java, and Microsoft® Foundation Classes, and the like.

Method

In general, a simplified but effective method of controlling exposure of a system for capturing images is proposed. Preferably, exposure analysis is confined to a fixed or adaptive region of interest within an image resolution matrix that defines the images, thereby decreasing required processing power and image background influence. Average image brightness over the region of interest is a preferred control parameter used in a control algorithm to ensure the effectiveness of exposure adjustment. In the algorithm, the average image brightness is compared to a target brightness range and value, which are preferably developed by extracting information from a set of training images. Thereafter, exposure of the system is adjusted based on the brightness comparison. The algorithm quickly iterates until the average brightness value is within the target brightness range. Preferably, the method is deployed with a vision-based occupant sensing system in a vehicle environment to yield a significant improvement in immunity to widely varying lighting conditions in the vehicle.

More specifically, FIG. 2 illustrates an exemplary method 200 preferably used in connection with the previously described system 10. As shown in FIG. 2, the method 200 begins with step 202 wherein image capturing is activated such that the imagers 18 capture video data for conversion by the interface 20 and for transmission to the image processing module 14. In step 204, image frames or stills are "grabbed" or captured by the image frame grabber 28 of the image processing module 14. In step 206, captured image frames are transferred to any suitable downstream or end-use processor. For example, a $k_{th}$ image frame F(k) may be grabbed and subsequently transferred to a downstream processor such as a processor used in a vehicle occupant sensing system. In another example, the image frames may be stored in the memory 32 and executed by the CPU 30 under control of software including one or more vehicle occupant sensing algorithms loaded to memory 32 and also executed by the CPU 30. In other words, the CPU 30 may be used in common to execute the present method as well as downstream occupant sensing methods that may be used in conjunction with further downstream methods such as airbag deployment methods, or the like.

Preferably simultaneous with step 206, in step 208 the current image frame F(k) is masked using a Region of Interest (ROI) mask for exposure control purposes. The ROI mask defines a region or regions in the image frame where further image analysis will be executed, such as where a vehicle occupant is likely to be located for any given vehicle occupant analysis. Image regions outside the mask will be ignored in this process, thereby limiting the influence of background or irrelevant imaging areas, and thereby achieve faster exposure processing time.

As shown in FIGS. 3 and 4, different regions of interest can be used. In a fixed mode depicted in FIG. 3, an ROI 302 may be fixed according to a predetermined likely location of an imaging subject 304 such as an occupant in a vehicle. More specifically, the ROI 302 may correspond to a predetermined matrix of pixels that is within an overall image resolution matrix 306 defined by the imager 18. The overall image resolution matrix 306 in turn may correspond to the limits of the imaging field of view defined by the lens 16 and may thereby define the extents of captured images. In other words, the predetermined matrix of pixels includes boundaries that preferably correspond to boundaries within the field of view of the camera module lens 16 that defines an area in which an occupant is most likely to be located during any given event. Or as shown in FIG. 4, an ROI 402 may be adaptive when a subject 404 is dynamically tracked. For example, image segmentation may be used to separate a foreground (imaging subject or object) from a background within an overall pixel array or image resolution matrix 406, and the ROI substantially overlaps with the segmented image region in order to achieve optimized exposure control. In a third mode, an adaptive ROI mode may follow the fixed ROI mode to further fine tune and isolate the imaging subject or object of interest.

Figure 5:
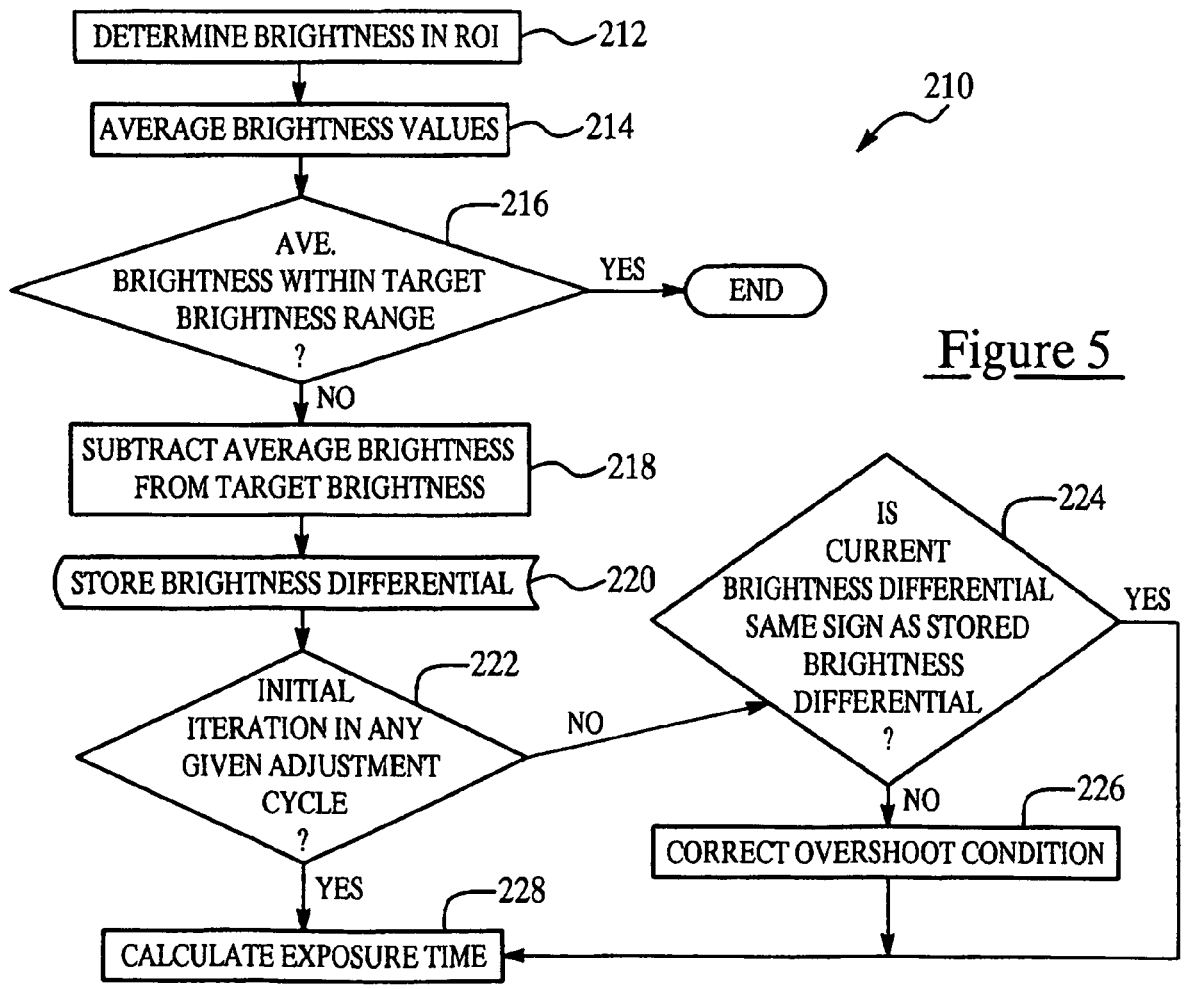
FIG. 5 is a flow chart of an exemplary embodiment of one of the steps of the method of FIG. 2.

Shown generally as step 210 in FIG. 2, and more specifically as steps 212 through 228 in FIG. 5, a preferred accumulative exposure analysis is performed on the ROI to provide feedback in controlling the exposure settings of the camera module 12. In step 212, image brightness may be determined according to any suitable parameter, but is preferably determined using a relatively simplified parameter such as average pixel brightness P. In order to avoid unstable conditions and noise influence, the parameter determination is based on a pre-determined number of image frames (n) captured by the frame grabber 28 from a current video stream. The choice of n depends on the required balance between the update speed and robustness of the application. Step 214 illustrates a brightness averaging process that may be performed across every pixel within an ROI of an image, sub-sampled across many pixels within the ROI of an image, and/or performed across ROI pixels of n images, or the like.

As shown in step 216, once the average pixel brightness P is determined, it is compared with a pre-determined target range Pmax to Pmin and target value Po, which preferably represents an average image brightness target. Frequently, such a target brightness range and value are set according to some visual or display industry standard. But such a standard may not necessarily be valid for optimizing system performance in certain applications. Rather, it is desirable to associate the target brightness value with attributes that are important in developing a downstream or end-use system application algorithm, such as a vehicle occupant sensing algorithm so that the exposure target optimizes performance of the downstream system such as a vehicle occupant sensing system.

The target value and/or range are selected to make the downstream or end-use application algorithm perform better than otherwise possible. For example, an occupant sensing algorithm may be developed based on a particular data set or "training set" of images to establish the exposure control target value and/or range. Therefore, it is desirable for the present method and system to adjust exposure to match the typical "training set" conditions, which may not necessarily be typical "good" conditions for viewing or displaying images. The three parameters Po, Pmax, and Pmin are established according to a statistical distribution to represent the typical conditions of the "training set". More specifically, the training set may include tens of thousands of images captured in any given vehicle under vastly different vehicle lighting environments.

In order to obtain stable exposure control, the acceptable target control margin or range around the target Po should also be established using the same "training set" of data. As shown in step 216 of FIG. 5, once the average pixel brightness P is within this target brightness range or margin, the control method will stop making further exposure adjustments.

Figure 6:
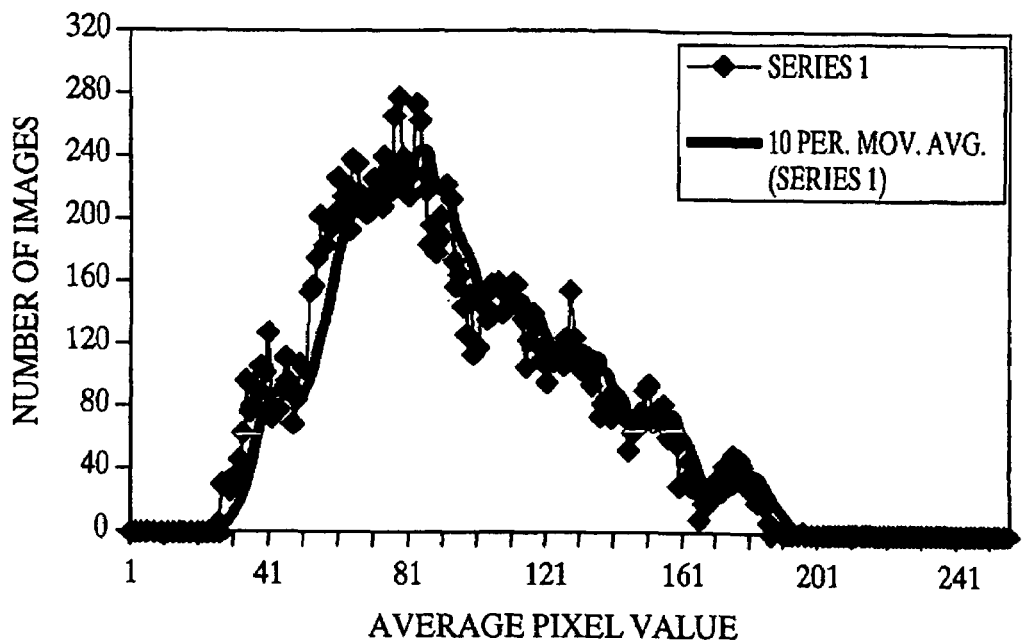
FIG. 6 is a plot of image brightness distribution across a plurality of images used in setting an image exposure target value for use in the method of FIG. 2.

FIG. 6 shows a histogram of average pixel value in a selected ROI with an exemplary set of training images. Such an image set may be used to train a neural network based classifier for occupant sensing applications. A smoothed data-fitting curve with a ten-sample moving average is also plotted. The data was collected from a variety of lighting conditions in the vehicle environments. During development of the exposure control method, the majority of images used in the training set centered on an averaged pixel brightness value of 85, which is relatively dim along the scale of 0 to 255. Accordingly, the target brightness value is set near 85 with any suitable target margin, such as +/− 10.

Referring to FIG. 5, in step 218 the average pixel brightness P is subtracted from the target brightness value Po to establish a brightness error or differential (Po-P) therebetween used in calculating an adjusted exposure time. The method advances to step 220 wherein the differential is stored to memory for use in a subsequent exposure adjustment cycle if necessary. Then, in step 222 it is determined whether or not the brightness differential is being calculated for the first time in any given exposure adjustment cycle. If not, then the method advances to step 224 as will be described further herein below. If so, however, then the method advances to step 228, described below.

As represented by the exposure calculation step 228, an exposure time error signal can expressed with a linear approximation by the following exposure equation:

$$\Delta T \equiv T(k+n) - T(k) = \alpha \frac{P_o - P}{G},$$

where T(k+n) is the target integration time for an upcoming adjustment, T(k) is the current camera integration time, a is a pre-determined feedback strength coefficient, and G is the camera system gain. When the gain G is kept as a constant during the exposure control, the control error signal $\Delta T$ becomes linearly proportional to the brightness error or differential (Po-P). The feedback strength coefficient a determines the step size in making adjustment that affects the speed and smoothness of the control. If $\alpha=1$, then only one adjustment is needed to reach the target value in principle. However, due to likely errors in the distribution estimation by the above exposure equation, a fraction of one should be chosen to obtain smooth or even achievable exposure control, such as 0.25 or any other suitable value that may be determined for a particular application.

Figure 7:
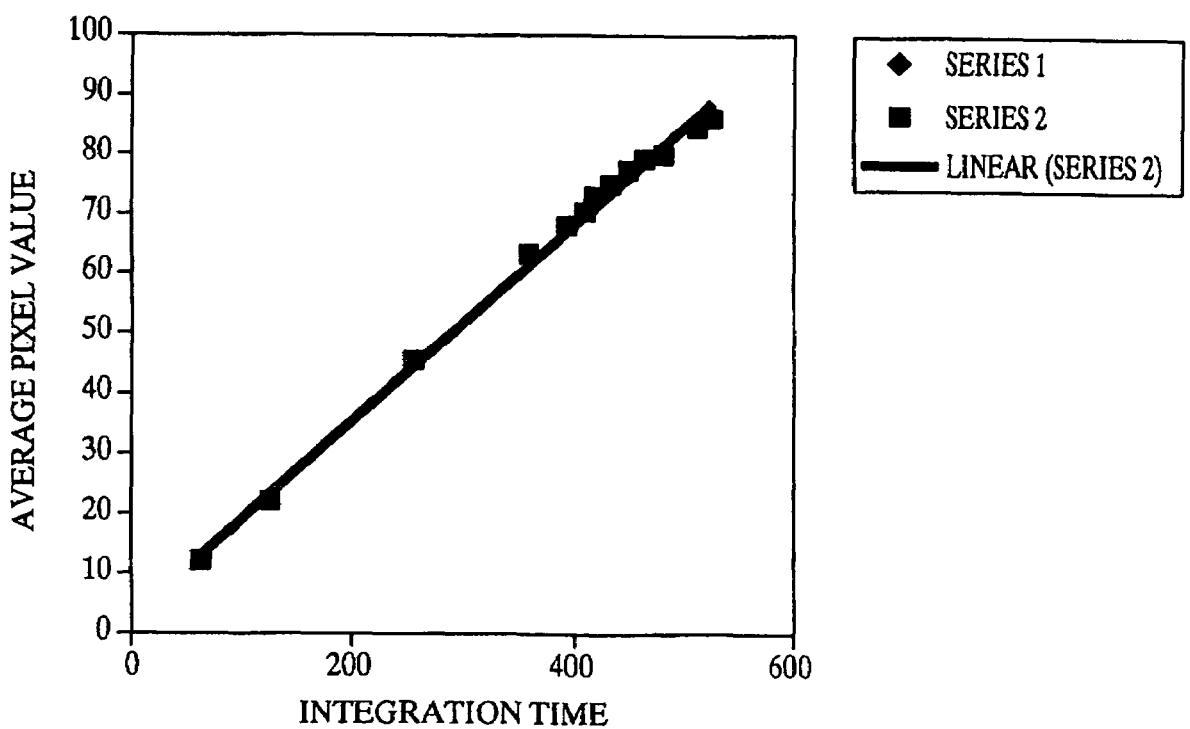
FIG. 7 is a graph of global image gain used in developing the method of FIG. 2.

The definition of camera system gain G here may be different from the electronic gain of the camera module 12. The camera system gain G defined by the integration error equation can be obtained experimentally by plotting an exemplary image pixel intensity distribution vs. an exemplary integration time as shown by FIG. 7. The camera electronic gain is kept constant and the feedback strength coefficient a is set to 1 in determining G.

Returning to the exposure analysis 210 of FIG. 5, if at step 220 it is determined that the current exposure iteration is not the first in a given exposure adjustment cycle, then the process continues to step 224, which is directed to potential overadjustment errors.

Overadjustment errors or adjustment overshooting occurs when the brightness differential (Po-P) changes signs from the most recent iteration of the process. Therefore, in step 224 the sign of the differential—positive or negative—is determined and compared to the differential determined during the immediately preceding iteration of the method. If the signs are opposite, then the exposure control process is not converging on the target Po. For example, when the current image is very dark or very bright (i.e. nonlinear condition) the linear approximation of the image brightness becomes inaccurate and the exposure control loop may fall into oscillation between very dark and very bright states. Choosing a smaller feedback strength coefficient a can minimize this effect but at the same time, will cause undesired slow response for the exposure adjustment. A preferred solution is to use a separate approach when such overshooting occurs during the exposure control process.

Figure 8:
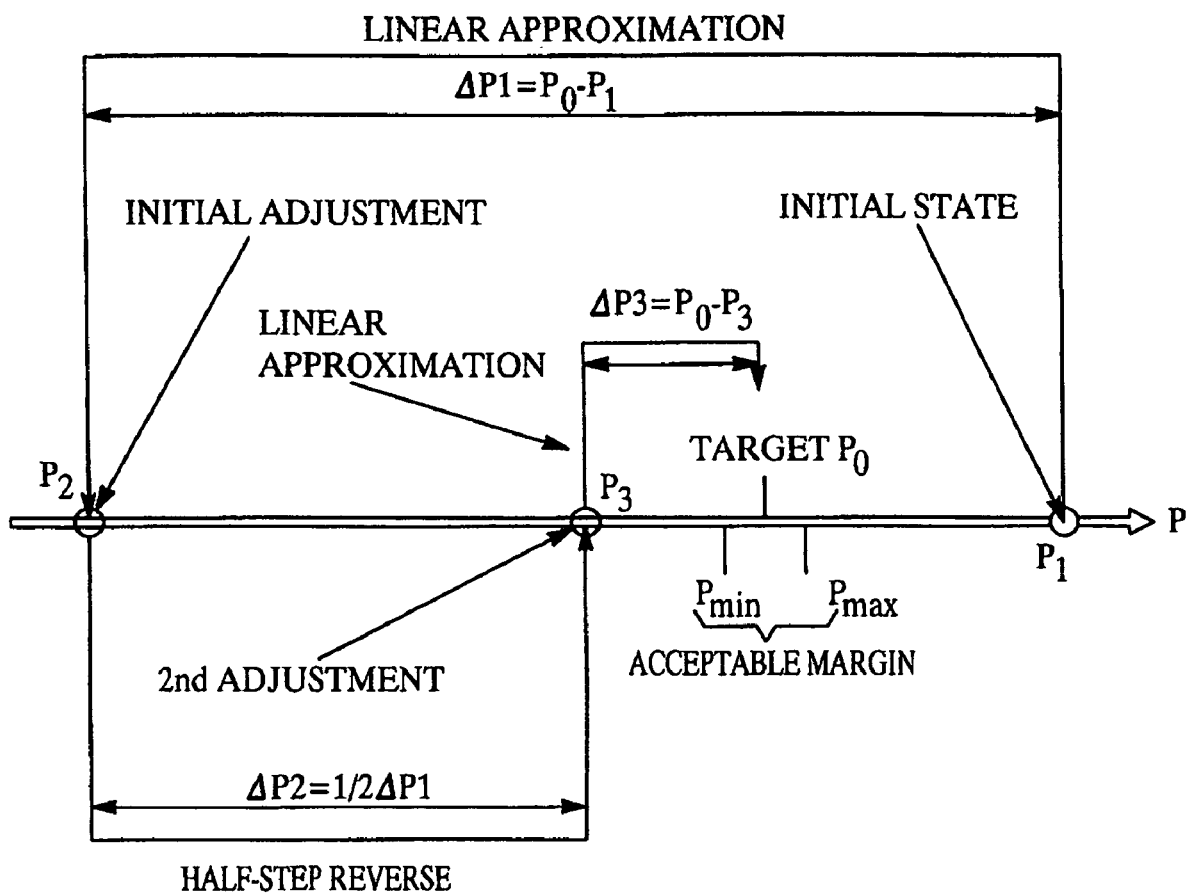
FIG. 8 is a diagram representing a numerical approximation according to the method of FIG. 3.

As represented by step 226 in FIG. 8, the method eliminates the potential control oscillations or instability, by using a "half-step reverse" correction after overshooting is detected. The average pixel brightness P is used to indicate the exposure state of each image. Assuming the initial state is P1, and an initial exposure adjustment is made according the difference between the target Po and the estimated state P1 as described by the linear equation. This adjustment leads to a new estimated state P2. Unless adjustment overshooting occurs, the method will iterate until the brightness P is within the acceptable control target margin defined by Pmin and Pmax around the target Po, as previously described. However, if P2 and P1 end up on opposite sides of the target state Po as indicated in the example, a reversal in direction is required for the next adjustment. In this case, the linear approximation would cease and the next adjustment error signal will be divided by any suitable predetermined factor from the previous adjustment that caused the overshooting. This half-step reverse process iterates until no more reverse adjustment is needed. In the example of FIG. 8, this state is indicated by P3, which is not in the acceptable target margin but is on the same side of the target state Po as P2. Therefore, the "half-step reverse process" is no longer needed and further adjustment will resume the linear approximation process as described by the linear equation. This method ensures a fast convergent control process for the exposure adjustment as long as the minimal control steps of the system are smaller than the acceptable control margin.

Referring again to FIG. 2, and as depicted by step 230, the system will convert the estimated error signal $\Delta T$ into suitable control signals to activate the camera exposure adjustment. Those of ordinary skill in the art will recognize that this step involves sending signals to camera integration time control registers of the imagers 18 to alter the exposure thereof. For example, the imagers 18 may have a frame time of 45 ms with minimum and maximum integration times set to 40-45 ms.

Figure 9:
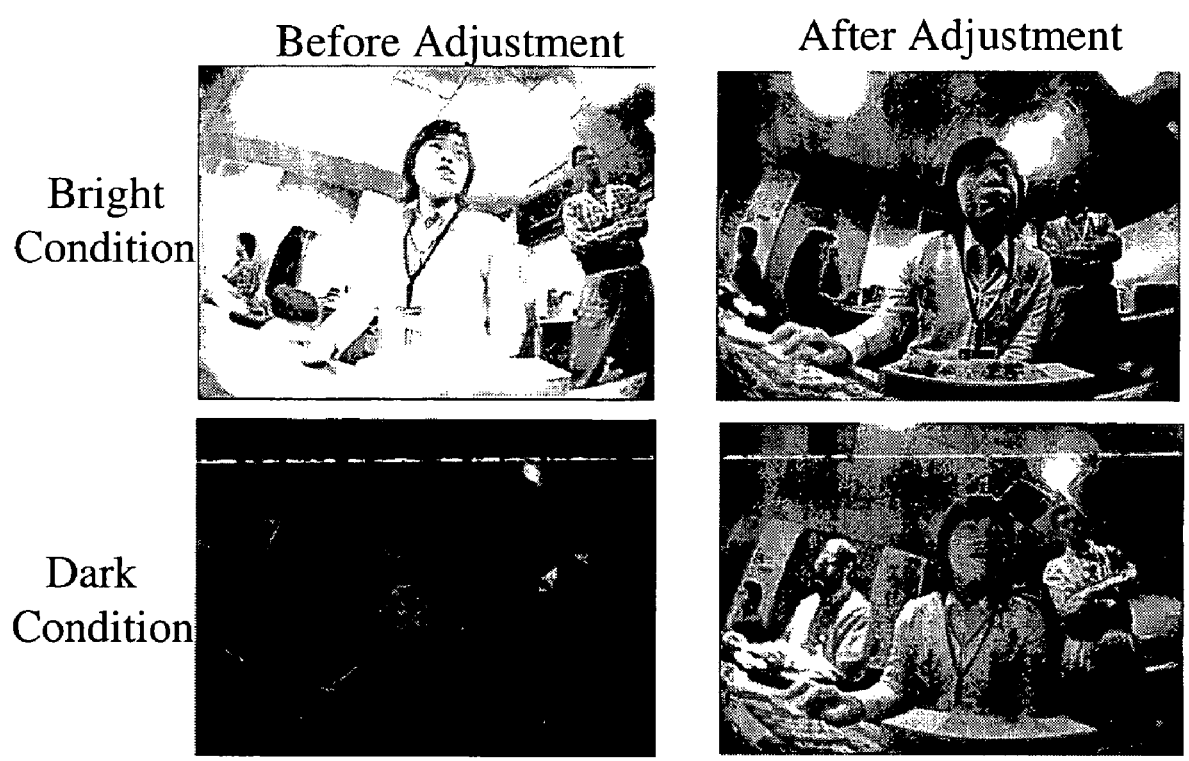
FIG. 9 is a photographic array illustrating exemplary results of using the method of FIG. 2 in bright and dark conditions.

Finally, FIG. 9 illustrates exemplary image intensity conditions before and after the exposure adjustment with the method. FIG. 9 shows both bright and dark conditions, before and after controlling exposure of the exemplary imaging system according to the exemplary method described herein.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

We claim:

1. A method of exposure control for an imaging system, comprising:
   (a) capturing a predetermined number of images, wherein the images are defined by an image resolution matrix;
   (b) masking the images to establish a region of interest within the image resolution matrix;
   (c) analyzing brightness of the images within the region of interest, wherein the analyzing brightness step further comprises:
      determining brightness values of the images within the region of interest,
      averaging the brightness values to obtain an average brightness value,
      comparing the average brightness value to a target brightness range, wherein the method stops if the average brightness value is within the target brightness range, but otherwise the method continues, and
      subtracting the average brightness value from a target brightness value to establish a brightness differential;
   (d) calculating an exposure time for a subsequent image capturing step based on the analyzing brightness step;
   (e) adjusting an exposure time setting during the subsequent image capturing step based on the calculated exposure time;
   (f) again capturing a predetermined number of images;
   (g) again masking the images to establish the region of interest;
   (h) determining brightness values of the images within the region of interest;
   (i) averaging the brightness values to obtain a new average brightness value;
   (j) subtracting the new average brightness value from the target brightness value to establish a new brightness differential;
   (k) determining the sign of the new brightness differential;
   (l) comparing the sign of the new brightness differential to the sign of the brightness differential determined in an immediately preceding iteration of the method;
   (m) correcting an overadjustment condition when the sign of the new brightness differential is opposite the sign of the brightness differential, by dividing the new brightness differential by a predetermined factor to yield a corrected brightness differential;
   (n) calculating an exposure time for a further subsequent image capturing step based on the corrected brightness differential when the sign of the subsequent brightness differential is opposite that of the sign of the brightness differential, and based on the brightness differential when the sign is the same; and
   (o) adjusting exposure during the further subsequent image capturing step based on the calculated exposure time in step (n).

2. The method of exposure control of claim 1, wherein the calculating step is carried out according to the equation:

$$\Delta T \equiv T(k+n) - T(k) = \alpha \frac{P_o - P}{G}$$

wherein
   T(k+n) is the exposure time for the subsequent image capturing step;
   T(k) is a current exposure time;
   $\alpha$ is a feedback strength coefficient;
   $P_O$ is the target brightness value;
   P is the average brightness value;
   $P_O$-P is the brightness differential; and
   G is an empirical gain value.

3. The method of exposure control of claim 1, wherein the target brightness value is developed from a plurality of training images.

4. The method of exposure control of claim 1, wherein the method repeats until the at least one brightness value is within a predetermined range of the target brightness value.

5. An imaging system, comprising:
   an imager having a plurality of elements that define an image resolution matrix;

a lens to direct radiant energy on the imager;
a controller to control the imager;
an image capture device to capture a predetermined number of images defined by the image resolution matrix;
an image processor in communication with the image capture device; and
a memory in communication with the image processor to store a computer-readable medium carrying instructions executable by the image processor to control the system in carrying out the following functions:
  (a) masking each image to establish a region of interest within the image resolution matrix;
  (b) analyzing brightness of each image within the region of interest, further comprising:
    determining brightness values of the images within the region of interest,
    averaging the brightness values to obtain an average brightness value,
    comparing the average brightness value to a target brightness range,
    ceasing exposure control if the average brightness value is within the target brightness range, but otherwise continuing exposure control, and
    subtracting the average brightness value from a target brightness value to establish a brightness differential;
  (c) calculating an exposure time for a subsequent image capture based on the brightness analysis;
  (d) adjusting an exposure time setting of the imager during the subsequent image capture based on the calculated exposure time;
  (e) again capturing a predetermined number of images on the imager;
  (f) again masking the images to establish the region of interest;
  (g) determining brightness values of the images within the region of interest;
  (h) averaging the brightness values to obtain a new average brightness value;
  (i) subtracting the new average brightness value from the target brightness value to establish a new brightness differential;
  (j) determining the sign of the new brightness differential;
  (k) comparing the sign of the new brightness differential to the sign of the brightness differential;
  (l) correcting an overadjustment condition when the sign of the new brightness differential is opposite the sign of the brightness differential, by dividing the subsequent brightness differential by a predetermined factor to yield a corrected brightness differential;
  (m) calculating an exposure time for a further subsequent image capture based on the corrected brightness differential when the sign of the subsequent brightness differential has reversed compared to the sign of the brightness differential, and based on the brightness differential when the sign has not reversed; and
  (n) adjusting exposure during the further subsequent image capture based on the calculated exposure time.

6. The imaging system of claim 5, wherein the processor carries out calculating step according to the equation:

$$\Delta T \equiv T(k+n) - T(k) = \alpha \frac{P_o - P}{G}$$

wherein
  T (k+n) is the exposure time for the subsequent image capture;
  T (k) is a current exposure time;
  $\alpha$ is a feedback strength coefficient;
  $P_o$ is the target brightness value;
  P is the average brightness value;
  $P_o$-P is the brightness differential; and
  G is an empirical gain value.

* * * * *